United States Patent
Tsukatani et al.

(10) Patent No.: US 12,013,345 B2
(45) Date of Patent: Jun. 18, 2024

(54) DIAGNOSTIC DICTIONARY REGISTERING DEVICE, DIAGNOSING DEVICE, METHOD, PROGRAM, AND DATA STRUCTURE

(71) Applicant: NIPPON TELEGRAPH AND TELEPHONE CORPORATION, Tokyo (JP)

(72) Inventors: Shunsuke Tsukatani, Tokyo (JP); Shingo Ando, Tokyo (JP); Tetsuya Kinebuchi, Tokyo (JP)

(73) Assignee: NIPPON TELEGRAPH AND TELEPHONE CORPORATION, Tokyo (JP)

(*) Notice: Subject to any disclaimer, the term of this patent is extended or adjusted under 35 U.S.C. 154(b) by 861 days.

(21) Appl. No.: 16/970,876

(22) PCT Filed: Feb. 6, 2019

(86) PCT No.: PCT/JP2019/004170
§ 371 (c)(1),
(2) Date: Aug. 18, 2020

(87) PCT Pub. No.: WO2019/163512
PCT Pub. Date: Aug. 29, 2019

(65) Prior Publication Data
US 2020/0378898 A1 Dec. 3, 2020

(30) Foreign Application Priority Data

Feb. 20, 2018 (JP) .................................. 2018-028304

(51) Int. Cl.
*G01N 21/88* (2006.01)
*G01N 21/31* (2006.01)
(Continued)

(52) U.S. Cl.
CPC ............. *G01N 21/88* (2013.01); *G01N 21/31* (2013.01); *G01N 21/55* (2013.01); *G06N 5/04* (2013.01);
(Continued)

(58) Field of Classification Search
CPC ........ G01N 21/88; G01N 21/31; G01N 21/55; G01N 21/8851; G01N 21/9515;
(Continued)

(56) References Cited

U.S. PATENT DOCUMENTS

2005/0098728 A1* 5/2005 Alfano ............... G01N 21/3581
250/341.8

FOREIGN PATENT DOCUMENTS

CN 105247343 A * 1/2016 ........... G01N 17/006

OTHER PUBLICATIONS

CN-105247343-A (English translate), Jan. 2016, 22 pp. (Year: 2016).*

(Continued)

*Primary Examiner* — Aditya S Bhat

(57) ABSTRACT

The disclosed technology describes determining and registering dictionary data to diagnose a deteriorating state of a surface of a diagnose object. The method comprises receiving spectral distribution information of deteriorating surface regions of a target object. Given the spectral distribution information and a predetermined spectral distribution information of a reference object, the present technology determines a reference reflectance value of the target object and registers the reference reflectance value of the target object as dictionary data. The reference reflectance value is approximately the same regardless of a progressing state of deterioration of a surface of the target object. Given the dictionary data, the present invention estimates a deterioration state of a surface of a diagnose object under a variety of (Continued)

type of light sources with accuracy, without measuring spectral distribution information about a light source used at the time of measuring spectral data of the diagnose object.

20 Claims, 5 Drawing Sheets

(51) Int. Cl.
    *G01N 21/55*     (2014.01)
    *G06N 5/04*     (2023.01)
    *G06N 20/00*     (2019.01)

(52) U.S. Cl.
    CPC ....... *G06N 20/00* (2019.01); *G01N 2201/061* (2013.01)

(58) Field of Classification Search
    CPC ..... G01N 2201/061; G01N 2021/8864; G01N 2021/8883; G01N 2021/8887; G06N 5/04; G06N 20/00

USPC .......................................................... 702/34
See application file for complete search history.

(56) References Cited

OTHER PUBLICATIONS

Kariya et al., Non-Destructive Evaluation of a Corroded Metal Surface Using Terahertz Waves, 2013, ECS Trans. 50, 81, 9 pp. ( Year: 2013).*

Saito, Mitsuru, et al., "Contruction of an Image Diagnosis Support System for Coating Film Deterioration of Steel Structure," Intelligence and Information (Journal of the Japan Society of Intelligent Information and Fuzzy Science) vol. 26, No. 4, pp. 737-751 (2014).

* cited by examiner

Fig. 3

| SURFACE STATE | SPECTRAL REFLECTANCE [400 nm, 410 nm, ..., 900 nm] | ATTRIBUTE |
|---|---|---|
| POLYETHYLENE PAINT | [0.4, 0.3, ···, 0.7] | FINE |
| RUST FLUID | [○, ○, ···, ○] | DETERIORATED |
| RED RUST | [○, ○, ···, ○] | DETERIORATED |
| BROWN RUST | [○, ○, ···, ○] | DETERIORATED |
| ... | | |

| REFERENCE WAVELENGTH RANGE | REFERENCE REFLECTANCE |
|---|---|
| $\lambda'$ | $R(\lambda')$ |

| PARAMETER | SPECTRAL DISTRIBUTION INFORMATION |
|---|---|
| PARAMETER 1 | [△, △, ···, △] |
| PARAMETER 2 | [△, △, ···, △] |
| PARAMETER 3 | [△, △, ···, △] |
| ... | |

DIAGNOSTIC DICTIONARY REGISTERING DEVICE, DIAGNOSING DEVICE, METHOD, PROGRAM, AND DATA STRUCTURE

CROSS-REFERENCE TO RELATED APPLICATIONS

This application is a U.S. 371 Application of International Patent Application No. PCT/JP2019/004170, filed on 6 Feb. 2019, which application claims priority to and the benefit of JP Application No. 2018-028304, filed on 20 Feb. 2018, the disclosures of which are hereby incorporated herein by reference in their entireties.

TECHNICAL FIELD

The present invention relates to a diagnosis dictionary registration device, a diagnosis device, a diagnosis dictionary registration method, a diagnosis method, a diagnosis dictionary registration program, a diagnosis program and a data structure of a diagnosis dictionary, and in particular to a diagnosis dictionary registration device for diagnosing surface states of a diagnosis target object, a diagnosis device, a diagnosis dictionary registration method, a diagnosis method, a diagnosis dictionary registration program, a diagnosis program and a data structure of a diagnosis dictionary.

BACKGROUND ART

For infrastructure facilities supporting a society, inspection/diagnosis is essential work in order to suppress serious accident risks. Especially for a facility made of metal, since corrosion/deterioration that seriously damages appearance and durability of the facility occurs, an inspection worker periodically performs visual corrosion/deterioration diagnosis. On a surface of the infrastructure facility, various matters, such as polyethylene paint coated on the metal to be material of the infrastructure facility, and rust fluid, red rust and brown rust generated due to aging deterioration, are measured as surface states. In deterioration diagnosis, for example, for each surface state, a rate of an area occupied by a part where deterioration has remarkably progressed is used for a diagnosis criterion, as a degree of deterioration.

In the method of visually inspecting the surface states to perform deterioration diagnosis, however, there is a possibility that diagnosis result variations occur due to difference among inspection workers' experiences. In view of the present situation as described above, various technical developments have been advanced in order to realize objective deterioration diagnosis.

For example, in a technique described in Non-Patent Literature 1, coating film deteriorated areas and undeteriorated areas in an image are classified, and a degree of coating film deterioration is diagnosed from distribution of the coating film deteriorated areas.

CITATION LIST

Non-Patent Literature

Non-Patent Literature 1: Mitsuru Saito, "Implementation of Image Diagnostic Support Systems for Coating of Steel Structure", Intelligence and Information, Vol. 26 (2014), No. 4, pp. 737-751

SUMMARY OF THE INVENTION

Technical Problem

A color tone of surface states of a diagnosis target object in an image obtained by photographing an infrastructure facility, which is a diagnosis target object, is influenced by illumination at the time of the photographing. In the outdoors, where the diagnosis target object is placed, the sun is dominantly a light source that illuminates the diagnosis target object when it is sunny during the day. In the evening or when it is cloudy, a light source other than the sun is influential. Thus, in the case of photographing a diagnosis target object outdoors, the light source significantly changes according to weather, and time and date. Therefore, as the light source changes, the color tone of the surface states of the diagnosis target object illuminated by the light of the light source naturally changes.

In the conventional technique described in Non-Patent Literature 1 stated before, deterioration diagnosis is performed using RGB values and an $L^*u^*v^*$ values based on a color tone. Therefore, there is a problem that the deterioration diagnosis is susceptible to influence of change in the color tone due to difference among light sources, and a deterioration state may be misjudged. Therefore, in order to identify surface states of a diagnosis target object robustly against change in the color tone due to difference among light sources, it is necessary to measure spectral distribution information about the light sources with a spectrometer or the like, calculate spectral reflectances of the surface states in addition to the spectral distribution information measured on the surface states, and then perform correction to a color tone under a light source under which identification of the surface states should be performed.

The spectral reflectance indicates a rate of energy that an object reflects for each wavelength of a light source to spectral distribution, which is strength of energy of each wavelength of the light source. Therefore, the spectral reflectance is indicated by a ratio of a luminous flux incident on an object surface and a reflected luminous flux at each spectrum and, therefore, can be said to be a characteristic that is robust even against change of a light source.

Further, the spectral reflectance has a unique characteristic for each surface state, and it becomes possible to, by using a spectral image for measuring not only a visible light area but also a near-infrared light area and an infrared light area in detail, easily identify such an object that is difficult to distinguish by visual inspection or in an RGB image because of its similar color tone.

In order to calculate spectral reflectances of surface states, it is necessary to measure spectral distribution information about a light source in addition to spectral distribution information about the surface states obtained by a spectral image, which is measured by a hyperspectral camera. In general, an indirect measurement is carried out in a measurement method in such a manner that an object with an already-known reflectance, such as a standard reflective plate, is arranged beside a diagnosis target object, and calculation is then performed from spectral distribution information measured on the standard reflective plate using the already-known reflectance.

In this measurement method, however, it is necessary to arrange the standard reflective plate beside a diagnosis target object each time photographing is performed, which is a heavy burden on inspection workers. Further, there is a problem that, if an infrastructure facility which is difficult to access is a diagnosis target object, a situation that measurement is impossible occurs.

The present invention has been made to solve the above problems, and an object of the present invention is to provide a diagnosis dictionary registration device capable of, even under a different light source, such as outdoor light source, performing diagnosis of surface states of a diagnosis target object with a high accuracy without measuring spectral distribution information about the light source at the time of measuring the diagnosis target object, a diagnosis device, a method, a program and a data structure.

Means for Solving the Problem

In order to achieve the above object, a diagnosis dictionary registration device according to the present invention is configured, including: a spectral reflectance calculation section calculating, based on pieces of spectral distribution information measured for different surface states of a diagnosis target object and spectral distribution information measured for a reference object with an already-known reflectance, spectral reflectances of the surface states; a reference setting section setting, based on a spectral reflectance of a surface state showing a deteriorated state, among the spectral reflectances of the surface states calculated by the spectral reflectance calculation section, a wavelength range within which reflectances at the same wavelength are within a predetermined range, and a reference reflectance based on reflectances of the surface states within the wavelength range; and a dictionary registration section registering the spectral reflectances of the surface states calculated by the spectral reflectance calculation section, the wavelength range and the reference reflectance set by the reference setting section, and pieces of spectral distribution information about a plurality of light sources, as a dictionary used at time of diagnosing the surface states of the diagnosis target object.

A diagnosis dictionary registration method according to the present invention is a method in which a spectral reflectance calculation section calculates, based on pieces of spectral distribution information measured for different surface states of a diagnosis target object and spectral distribution information measured for a reference object with an already-known reflectance, spectral reflectances of the surface states; a reference setting section sets, based on a spectral reflectance of a surface state showing a deteriorated state, among the spectral reflectances of the surface states calculated by the spectral reflectance calculation section, a wavelength range within which reflectances at the same wavelength are within a predetermined range, and a reference reflectance based on reflectances of the surface states within the wavelength range; and a dictionary registration section registers the spectral reflectances of the surface states calculated by the spectral reflectance calculation section, the wavelength range and the reference reflectance set by the reference setting section, and pieces of spectral distribution information about a plurality of light sources, as a dictionary used at time of diagnosing the surface states of the diagnosis target object.

A diagnosis dictionary registration program according to the present invention is a program for causing a computer to function as: a spectral reflectance calculation section calculating, based on pieces of spectral distribution information measured for different surface states of a diagnosis target object and spectral distribution information measured for a reference object with an already-known reflectance, spectral reflectances of the surface states; a reference setting section setting, based on a spectral reflectance of a surface state showing a deteriorated state, among the spectral reflectances of the surface states calculated by the spectral reflectance calculation section, a wavelength range within which reflectances at the same wavelength are within a predetermined range, and a reference reflectance based on reflectances of the surface states within the wavelength range; and a dictionary registration section registering the spectral reflectances of the surface states calculated by the spectral reflectance calculation section, the wavelength range and the reference reflectance set by the reference setting section, and pieces of spectral distribution information about a plurality of light sources, as a dictionary used at time of diagnosing the surface states of the diagnosis target object.

According to the diagnosis dictionary registration device, method and program according to the present invention, it is possible to, even under a different light source, such as outdoor light source, register information for performing diagnosis of surface states of a diagnosis target object with a high accuracy without measuring spectral distribution information about the light source at the time of measuring a diagnosis target object, with a dictionary.

Further, in the diagnosis dictionary registration device, method and program according to the present invention, it is possible to use a standard light source model defined for a purpose of reproducing an outdoor illumination environment as each of the plurality of light sources.

A diagnosis device according to the present invention is a diagnosis device diagnosing surface states of a diagnosis target object by referring to the dictionary registered by the diagnosis dictionary registration device described above and is configured including: a light source estimation section estimating, from a spectral image in which a pixel corresponding to each of positions on the diagnosis target object has spectral distribution information at the position as a pixel value, spectral distribution information about a light source used at time of the spectral image being measured, based on a degree of similarity between spectral distribution information obtained by dividing spectral distribution information within the wavelength range registered with the dictionary, among pieces of spectral distribution information shown by pixel values of pixels included in an area specified as an area of the surface state showing the deteriorated state, by the reference reflectance registered with the dictionary, and pieces of spectral distribution information about a plurality of light sources registered with the dictionary; a spectral reflectance calculation section calculating, based on the spectral distribution information that each of pixels of the spectral image has and spectral distribution information about a standard light source estimated by the light source estimation section, a spectral reflectance at each of the positions on the diagnosis target object corresponding to the pixels; and a surface state diagnosis section diagnosing, based on the spectral reflectance corresponding to each of the pixels and the spectral reflectances of the surface states registered with the dictionary, a surface state at the position on the diagnosis target object corresponding to each of the pixels.

A diagnosis method according to the present invention is a diagnosis method for diagnosing surface states of a diagnosis target object by referring to the dictionary registered by the diagnosis dictionary registration method described above and is a method in which, a light source estimation section estimates, from a spectral image in which a pixel corresponding to each of positions on the diagnosis target object has spectral distribution information at the position as a pixel value, spectral distribution information about a light source used at time of the spectral image being measured, based on a degree of similarity between spectral distribution information obtained by dividing spectral distribution information within the wavelength range registered with the dictionary, among pieces of spectral distribution information shown by pixel values of pixels included in an area specified as an area of the surface state showing the deteriorated state, by the reference reflectance registered with the dictionary, and pieces of spectral distribution information about a plurality of light sources registered with the dictionary; a spectral reflectance calculation section calculates, based on the spectral distribution information that each of pixels of the spectral image has and spectral distribution information about a standard light source estimated by the light source estimation section, a spectral reflectance at each of the positions on the diagnosis target object corresponding to the pixels; and a surface state diagnosis section diagnoses, based on the spectral reflectance corresponding to each of the pixels and the spectral reflectances of the surface states registered with the dictionary, a surface state at the position on the diagnosis target object corresponding to each of the pixels.

A diagnosis program according to the present invention is a diagnosis program for diagnosing surface states of a diagnosis target object by referring to the dictionary registered by the diagnosis dictionary registration program described above and is a program for causing a computer to function as: a light source estimation section estimating, from a spectral image in which a pixel corresponding to each of positions on the diagnosis target object has spectral distribution information at the position as a pixel value, spectral distribution information about a light source used at time of the spectral image being measured, based on a degree of similarity between spectral distribution information obtained by dividing spectral distribution information within the wavelength range registered with the dictionary, among pieces of spectral distribution information shown by pixel values of pixels included in an area specified as an area of the surface state showing the deteriorated state, by the reference reflectance registered with the dictionary, and pieces of spectral distribution information about a plurality of light sources registered with the dictionary; a spectral reflectance calculation section calculating, based on the spectral distribution information that each of pixels of the spectral image has and spectral distribution information about a standard light source estimated by the light source estimation section, a spectral reflectance at each of the positions on the diagnosis target object corresponding to the pixels; and a surface state diagnosis section diagnosing, based on the spectral reflectance corresponding to each of the pixels and the spectral reflectances of the surface states registered with the dictionary, a surface state at the position on the diagnosis target object corresponding to each of the pixels.

According to the diagnosis device, method and program according to the present invention, it is possible to, even under a different light source, such as outdoor light source, perform diagnosis of surface states of a diagnosis target object with a high accuracy without measuring spectral distribution information about the light source at the time of measuring a diagnosis target object.

Further, in the diagnosis device, method and program according to the present invention, the surface state diagnosis section can give each pixel of the spectral image an attribute showing whether a surface state at a position on a diagnosis target object corresponding to the pixel is a deteriorated state or a fine state, or information showing a kind of the surface state.

Further, in the diagnosis device, method and program according to the present invention, the surface state diagnosis section can calculate a degree of deterioration indicated by a rate of the number of pixels diagnosed to be in a deteriorated state to the number of pixels of the whole spectral image.

A data structure of a diagnosis dictionary according to the present invention is a data structure of a diagnosis dictionary used at time of diagnosing surface states of a diagnosis target, the data structure including: spectral reflectances of different surface states of the diagnosis target object calculated based on pieces of spectral distribution information measured for the surface states and spectral distribution information measured for a reference object with an already-known reflectance; a wavelength range within which reflectances at the same wavelength are within a predetermined range, and a reference reflectance based on reflectances of the surface states within the wavelength range, which are set based on a spectral reflectance of a surface state showing a deteriorated state, among the spectral reflectances of the surface states; and pieces of spectral distribution information about a plurality of light sources.

According to the data structure of a diagnosis dictionary according to the present invention, it is possible to function as a dictionary for, even under a different light source, such as outdoor light source, performing diagnosis of surface states of a diagnosis target object with a high accuracy without measuring spectral distribution information about the light source at the time of measuring a diagnosis target object.

Effects of the Invention

According to a diagnosis dictionary registration device, a diagnosis device, a method, a program and a data structure according to the present invention, a spectral reflectance of each surface state, a reference wavelength range, within which a reflectance is constant irrespective of a surface state, and a reference reflectance, and pieces of spectral distribution information about a plurality of light sources are registered with a dictionary. At the time of performing diagnosis, by estimating a light source based on a spectral image of a diagnosis target object and the information registered with the dictionary, and calculating a spectral reflectance of each pixel of the spectral image, a surface state of a position on the diagnosis target object corresponding to each pixel is diagnosed. Thereby, it is possible to, even under a different light source, such as outdoor light source, perform diagnosis of surface states of a diagnosis target object with a high accuracy, without measuring spectral distribution information about the light source at the time of measuring a diagnosis target object.

BRIEF DESCRIPTION OF DRAWINGS

FIG. 3 is a diagram showing an example of a dictionary.

DESCRIPTION OF EMBODIMENT

An embodiment of the present invention will be described below in detail with reference to drawings.

Figure 1:
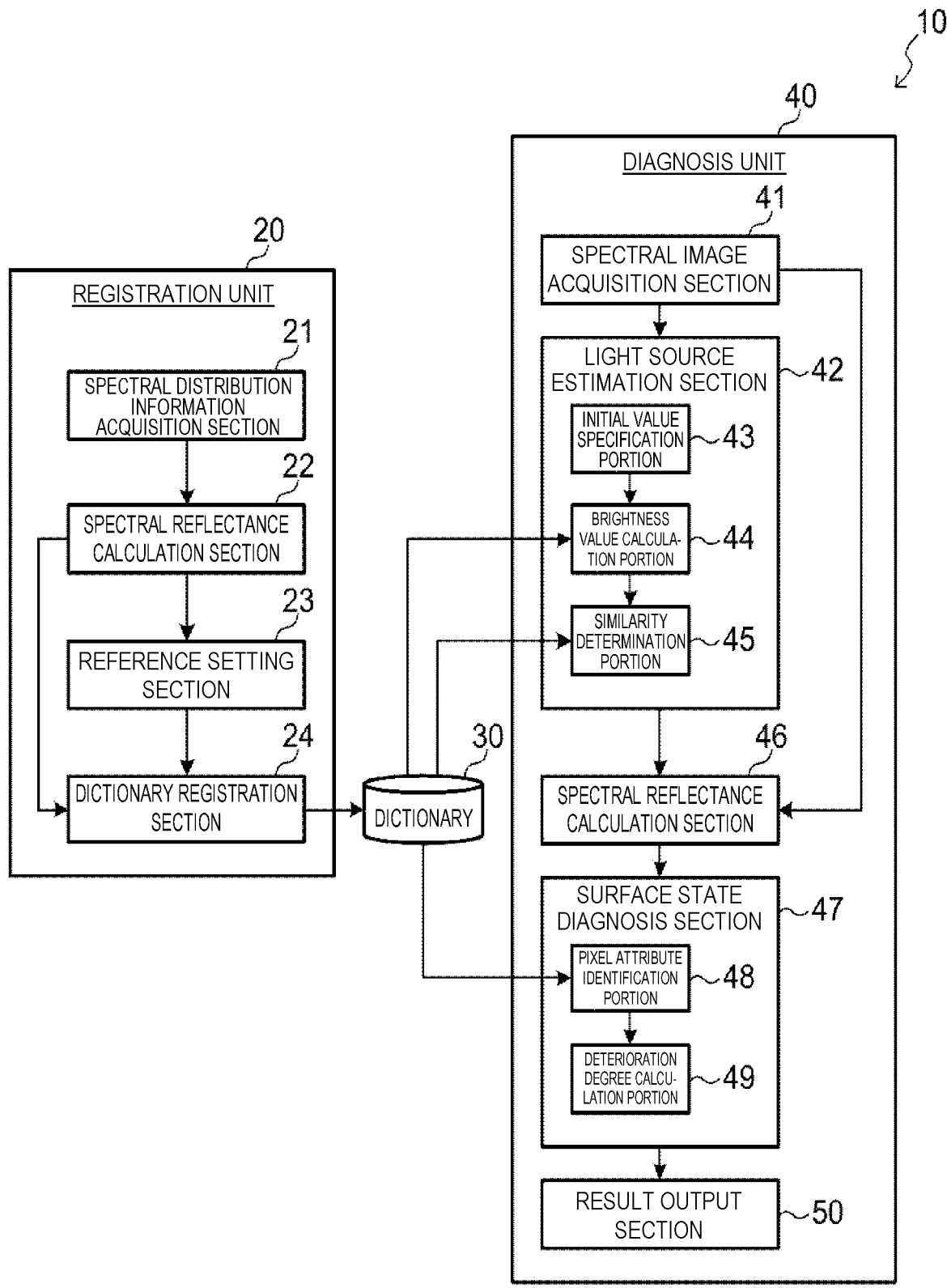
FIG. 1 is a functional block diagram of a deterioration diagnosis device according to the present embodiment.

A deterioration diagnosis device 10 of the embodiment of the present invention can be configured with a computer that includes a CPU, a RAM and a ROM storing a program for executing a registration processing routine and a diagnosis processing routine to be described later and various kinds of data. Functionally, this deterioration diagnosis device 10 can be represented by a configuration that includes a registration unit 20 and a diagnosis unit 40 as shown in FIG. 1. Note that the registration unit 20 is an example of a dictionary registration device of the present invention, and the diagnosis unit 40 is an example of a diagnosis device of the present invention.

First, the registration unit 20 will be described. The registration unit 20 can be represented by a configuration that includes a spectral distribution information acquisition section 21, a spectral reflectance calculation section 22, a reference setting section 23 and a dictionary registration section 24.

The spectral distribution information acquisition section 21 acquires spectral distribution information about each of surface states including a deterioration state of corrosion and the like existing on a surface of a diagnosis target object and original fine states of a coated part and the like. For example, the spectral distribution information about each surface state is measured using a spectrometer such as a hyperspectral camera, for each of samples of surface states of various matters such as polyethylene paint coated on metal to be material for an infrastructure facility, and rust fluid, red rust and brown rust that have occurred due to aging deterioration.

Further, the spectral distribution information acquisition section 21 acquires spectral distribution information measured for an object with an already-known spectral reflectance using a spectrometer, under the same photographing environment as the time of measuring the spectral distribution information about each surface state. In the present embodiment, a standard white plate is used as the object with an already-known spectral reflectance, and the reflectance is assumed to be 1.00.

The spectral distribution information acquisition section 21 hands over the acquired spectral distribution information about each surface state and the spectral distribution information about the standard white plate to the spectral reflectance calculation section 22. Note that the spectral distribution information is a brightness value (an amount of radiation or a photometric quantity) for each wavelength.

The spectral reflectance calculation section 22 calculates a spectral reflectance of each surface state from the spectral distribution information about each surface state and the spectral distribution information about the standard white plate that have been handed over from the spectral distribution information acquisition section 21. Specifically, the spectral reflectance calculation section 22 calculates a spectral reflectance $R(\lambda)$ for an arbitrary surface state by Formula (1), with a wavelength indicated as $\lambda$, the spectral distribution information about each surface state measured by the spectrometer indicated as $C(\lambda)$, and the spectral distribution information about the standard white plate indicated as $E(\lambda)$.

$$R(\lambda) = C(\lambda)/E(\lambda) \quad (1)$$

The spectral reflectance calculation section 22 hands over the calculated spectral reflectance $R(\lambda)$ of each surface state to the reference setting section 23 and the dictionary registration section 24.

Figure 2:
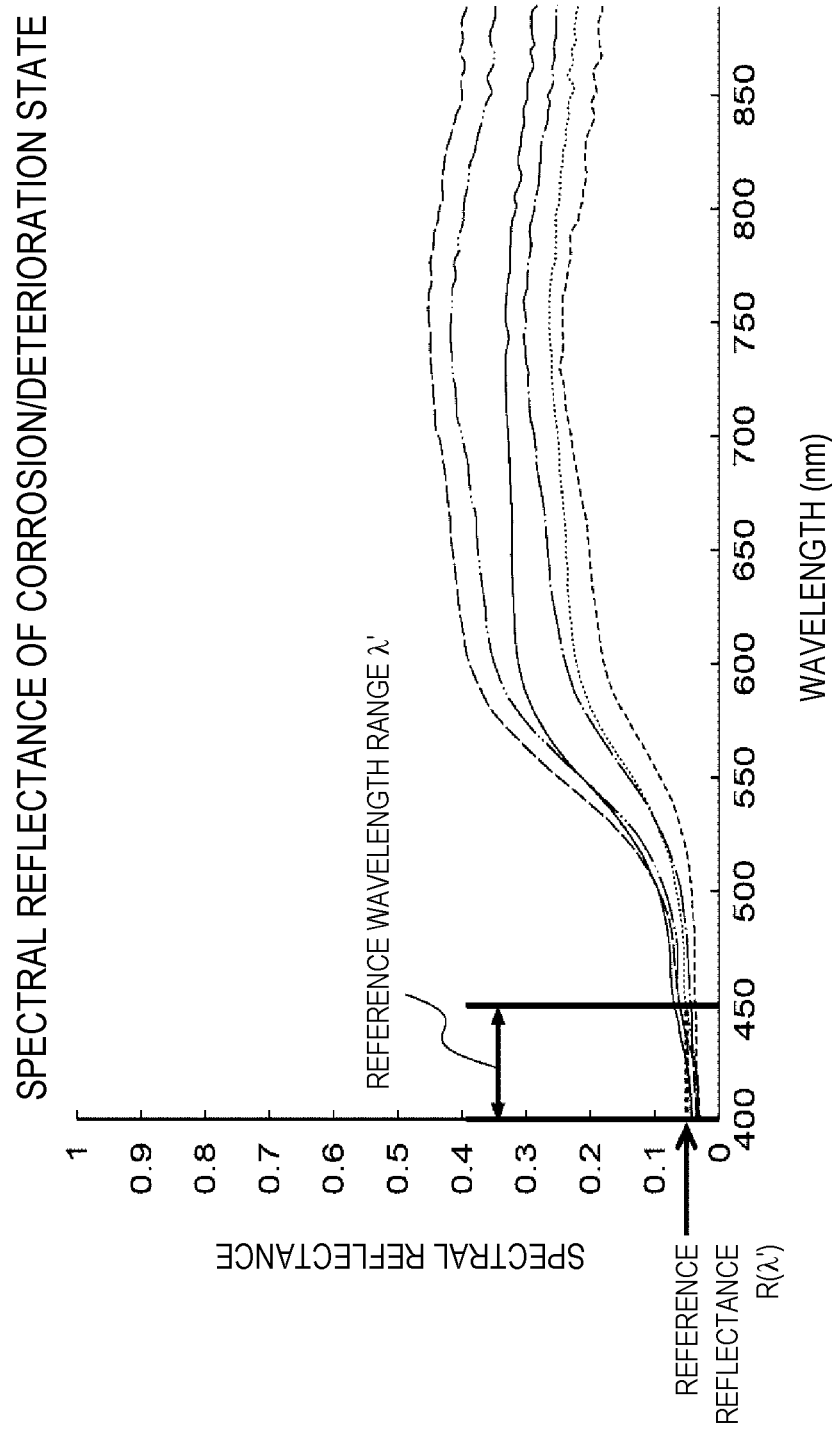
FIG. 2 is a diagram for illustrating setting of a reference wavelength range and a reference reflectance.

Here, FIG. 2 shows an example of the spectral reflectance of each surface state showing a corrosion/deterioration state. As shown in FIG. 2, when a surface state is a corrosion/deterioration state, a wavelength range within which the reflectance is almost constant irrespective of a state of corrosion/deterioration (a degree of progress of corrosion) exists. Therefore, even if the surface states of an observation target object in a corrosion/deterioration state are unknown, it can be assumed that the reflectance of that part is a reflectance within a wavelength range within which the reflectance is almost constant.

Therefore, from spectral reflectances of surface states of corrosion/deterioration state samples, among the spectral reflectances of the surface states handed over from the spectral reflectance calculation section 22, the reference setting section 23 sets a wavelength range within which a reflectance is almost constant and the reflectance as a reference wavelength range $\lambda'$ and a reference reflectance $R(\lambda')$.

For example, the reference setting section 23 can present a spectral reflectance graph as shown in FIG. 2 to a user, accept a wavelength range and reflectance specified by the user, and set the accepted wavelength range and reflectance as the reference wavelength range $\lambda'$ and the reference reflectance $R(\lambda')$.

Further, for example, the reference setting section 23 may determine a wavelength range within which reflectances at the same wavelength have values within a predetermined range and set the wavelength range as the reference wavelength range $\lambda'$. Whether the reflectances at the same wavelength are within the predetermined range or not can be determined, for example, by variance of the reflectances at the same wavelength or by determining whether a difference between the largest and smallest reflectance values at the same wavelength is equal to or smaller than a predetermined value. Further, in this case, the reference setting section 23 can set an average, the largest value, the smallest value or the like of reflectances within the set reference wavelength range $\lambda'$ as the reference reflectance $\lambda'$.

The reference setting section 23 hands over information about the set reference wavelength range $\lambda'$ and reference reflectance $R(\lambda')$ to the dictionary registration section 24.

With the spectral reflectance of each surface state handed over from the spectral reflectance calculation section 22, the dictionary registration section 24 associates identification information about the surface state and an attribute showing whether the surface state is a deteriorated state or a fine state, and registers the association with a dictionary 30 as a spectral reflectance table 31, for example, as shown in FIG. 3. Note that, in the example of FIG. 3, a sample name of a sample corresponding to a surface state is used as identification information about the surface state. Further, the attribute showing whether a deteriorated state or a fine state is associated with each of the samples showing the surface states in advance, and it is assumed that, at the time of acquiring the spectral distribution information about each surface state, information about the sample name and the attribute is also acquired.

Further, the dictionary registration section 24 registers the information about the reference wavelength range $\lambda'$ and the reference reflectance $R(\lambda')$ handed over from the reference setting section 23 with the dictionary 30 as a reference table 32, for example, as shown in FIG. 3.

Further, the dictionary registration section 24 associates parameters of a standard light source model corresponding to a light source used at the time of measuring the spectral distribution information acquired by the spectral distribution information acquisition section 21 with pieces of spectral distribution information corresponding to the parameters and registers the association with the dictionary 30 as a light-source spectral distribution information table 33, for example, as shown in FIG. 3. More specifically, the light-source spectral distribution information table 33 can be, for example, a table in which a group of parameters of a standard light source model such as a CIE standard light source D obtained by formulating an outdoor light source are associated with spectral distribution information about the standard light source model calculated using the parameters.

Next, the diagnosis unit 40 will be described. The diagnosis unit 40 can be represented by a configuration that includes a spectral image acquisition section 41, a light source estimation section 42, a spectral reflectance calculation section 46, a surface state diagnosis section 47 and a result output section 50. Further, the light source estimation section 42 can be represented by a configuration that includes an initial value specification portion 43, a brightness value calculation portion 44 and a similarity determination portion 45. Further, the surface state diagnosis section 47 can be represented by a configuration that includes a pixel attribute identification portion 48 and a deterioration degree calculation portion 49.

The spectral image acquisition section 41 acquires a spectral image measured by a spectrometer such as a hyperspectral camera for an infrastructure facility or the like which is a diagnosis target object. The spectral image is an image in which each pixel constituting the image has spectral distribution information at a position on the diagnosis target object corresponding to the pixel, as a pixel value. The spectral image acquisition section 41 hands over the acquired spectral image to the initial value specification portion 43 and the spectral reflectance calculation section 46.

The initial value specification portion 43 presents the spectral image handed over from the spectral image acquisition section 41 to the user and accepts specification of an area showing a corrosion/deterioration position in the spectral image. The initial value specification portion 43 calculates an average of pieces of spectral distribution information which pixels included in the accepted specified area have, as an initial value $c(\lambda)$ and hands over the initial value $c(\lambda)$ to the brightness value calculation portion 44.

The brightness value calculation portion 44 calculates a brightness value $e(\lambda')$ obtained by dividing a brightness value $c(\lambda')$ of each wavelength within the reference wavelength range $\lambda'$ registered with the reference table 32 of the dictionary 30, in the initial value $c(\lambda)$ of the spectral distribution information about the spectral image handed over from the initial value specification portion 43, by the reference reflectance $R(\lambda')$ registered with the reference table 32 of the dictionary 30. A formula for calculating the brightness value $e(\lambda')$ is shown by Formula (2) below.

$$e(\lambda')=c(\lambda')/R(\lambda') \quad (2)$$

The brightness value calculation portion 44 hands over the calculated brightness value $e(\lambda')$ to the similarity determination portion 45.

The similarity determination portion 45 calculates a degree of similarity between the brightness value $e(\lambda')$ handed over from the brightness value calculation portion 44 and a brightness value of spectral distribution information within the reference wavelength range $\lambda'$ among the pieces of spectral distribution information for the parameters of the standard light source model registered with the light-source spectral distribution information table 33 of the dictionary 30. For calculation of the similarity, for example, a k-nearest neighbor method based on a Euclidean distance or other similarity calculation means can be used. The similarity determination portion 45 judges a parameter of the standard light source model with the highest similarity to the brightness value $e(\lambda')$ and hands over the parameter of the standard light source model to the spectral reflectance calculation section 46.

The spectral reflectance calculation section 46 acquires spectral distribution information about the standard light source model associated with the parameter of the standard light source model handed over from the similarity determination portion 45, from the light-source spectral distribution information table 33 of the dictionary 30. By dividing spectral distribution information about each pixel of the spectral image handed over from the spectral image acquisition section 41 by the spectral distribution information about the standard light source model acquired from the dictionary 30, the spectral reflectance calculation section 46 calculates a spectral reflectance of the pixel of the spectral image. The spectral reflectance calculation section 46 hands over the calculated spectral reflectance of each pixel of the spectral image to the pixel attribute identification portion 48.

The pixel attribute identification portion 48 identifies whether each position on the diagnosis target object corresponding to each pixel of the spectral image handed over from the spectral reflectance calculation section 46 is in a deteriorated state or in a fine state. Specifically, the pixel attribute identification portion 48 calculates a degree of similarity between the spectral reflectance of each pixel of the spectral image handed over from the spectral reflectance calculation section 46 and the spectral reflectance of each surface state registered with the spectral reflectance table 31 of the dictionary 30. For each pixel, the pixel attribute identification portion 48 assigns an attribute associated with a surface state with the highest degree of similarity to the spectral reflectance of the pixel of the spectral image, to the pixel. The pixel attribute identification portion 48 hands over the spectral image for which the attribute of each pixel has been identified, to the deterioration degree calculation portion 49.

The deterioration degree calculation portion 49 calculates a rate of the number of pixels to which an attribute indicating a deteriorated state is assigned, to an area (the number of pixels) of the whole spectral image, as a degree of deterioration. The deterioration degree calculation portion 49 hands over the calculated degree of deterioration to the result output section 50 as a diagnosis result.

The result output section 50 outputs the diagnosis result handed over from the deterioration degree calculation portion 49 by displaying the diagnosis result on a display device.

Figure 4:
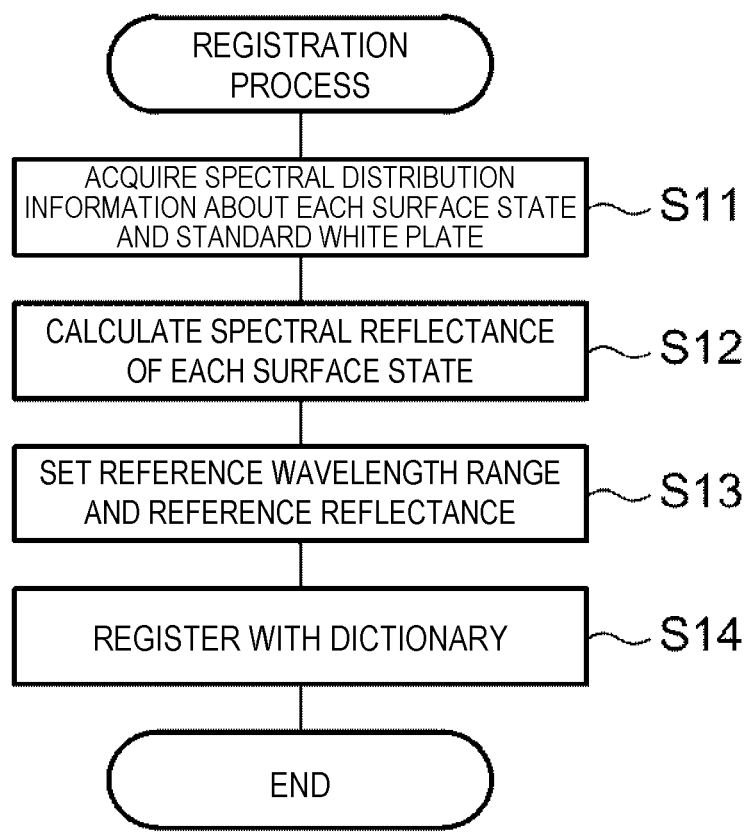
FIG. 4 is a flowchart showing an example of a registration processing routine.
Figure 5:
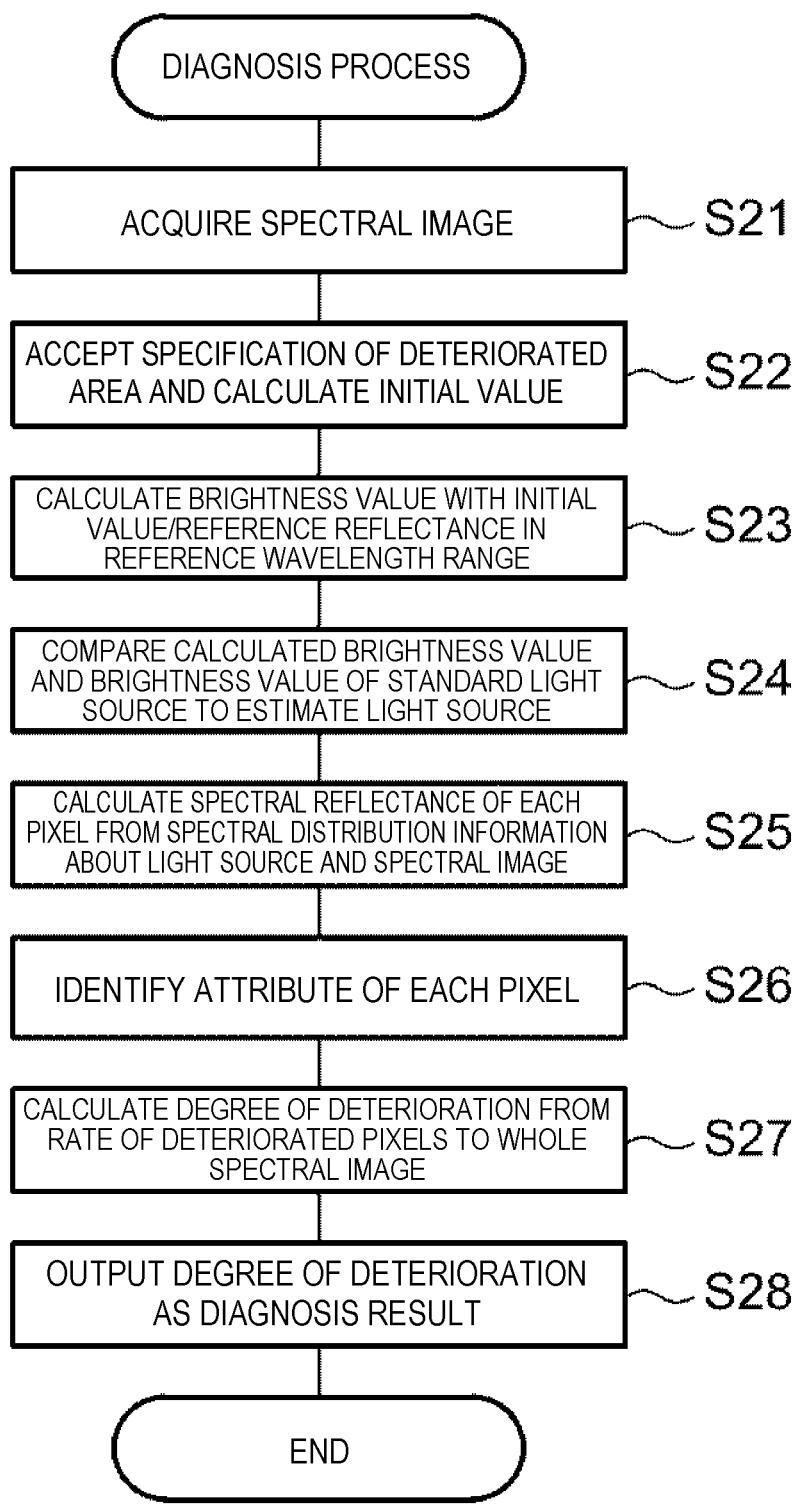
FIG. 5 is a flowchart showing an example of a diagnosis processing routine.

Next, an operation of the deterioration diagnosis device 10 according to the present embodiment will be described with reference to a flowchart showing a registration processing routine, which is shown in FIG. 4, and a flowchart showing a diagnosis processing routine, which is shown in FIG. 5.

First, a registration process will be described.

At step S11 of the registration process shown in FIG. 4, the spectral distribution information acquisition section 21 acquires spectral distribution information about each surface state, and spectral distribution information about a standard white plate measured in the same photographing environment as the time of measuring the spectral distribution information about each surface state. The spectral distribution information acquisition section 21 hands over the acquired spectral distribution information about each surface state and the spectral distribution information about the standard white plate to the spectral reflectance calculation section 22.

Next, at step S12, the spectral reflectance calculation section 22 calculates a spectral reflectance of each surface state by Formula (1) from the spectral distribution information about each surface state and the spectral distribution information about the standard white plate that have been handed over from the spectral distribution information acquisition section 21. The spectral reflectance calculation section 22 hands over the calculated spectral reflectance of each surface state to the reference setting section 23 and the dictionary registration section 24.

Next, at step S13, from spectral reflectances of surface states of corrosion/deterioration state samples, among the spectral reflectances of the surface states handed over from the spectral reflectance calculation section 22, the reference setting section 23 sets a wavelength range within which a reflectance is almost constant and the reflectance as a reference wavelength range $\lambda'$ and a reference reflectance $R(\lambda')$. The reference setting section 23 hands over information about the set reference wavelength range $\lambda'$ and reference reflectance $R(\lambda')$ to the dictionary registration section 24.

Next, at step S14, with the spectral reflectance of each surface state handed over from the spectral reflectance calculation section 22, the dictionary registration section 24 associates identification information about the surface state and an attribute showing whether the surface state is a deteriorated state or a fine state, and registers the association with the dictionary 30 as the spectral reflectance table 31, for example, as shown in FIG. 3. Further, the dictionary registration section 24 registers the information about the reference wavelength range $\lambda'$ and the reference reflectance $R(\lambda')$ handed over from the reference setting section 23 with the dictionary 30 as the reference table 32, for example, as shown in FIG. 3. Further, the dictionary registration section 24 associates parameters of a standard light source model corresponding to a light source used at the time of measuring the spectral distribution information acquired by the spectral distribution information acquisition section 21 with pieces of spectral distribution information corresponding to the parameters and registers the association with the dictionary 30 as the light-source spectral distribution information table 33, for example, as shown in FIG. 3, and the registration process ends.

Next, a diagnosis process will be described.

At step S21 of the diagnosis process shown in FIG. 5, the spectral image acquisition section 41 acquires a spectral image measured by a spectrometer such as a hyperspectral camera for an infrastructure facility or the like which is a diagnosis target object. The spectral image acquisition section 41 hands over the acquired spectral image to the initial value specification portion 43 and the spectral reflectance calculation section 46.

Next, at step S22, the initial value specification portion 43 presents the spectral image handed over from the spectral image acquisition section 41 to the user and accepts specification of an area showing a corrosion/deterioration position in the spectral image. The initial value specification portion 43 calculates an average of pieces of spectral distribution information which respective pixels included in the accepted specified area have, as an initial value $c(\lambda)$ and hands over the initial value $c(\lambda)$ to the brightness value calculation portion 44.

Next, at step S23, the brightness value calculation portion 44 calculates a brightness value $e(\lambda')$ obtained by dividing a brightness value $c(\lambda')$ of each wavelength within the reference wavelength range $\lambda'$ registered with the reference table 32 of the dictionary 30, in the initial value $c(\lambda)$ of the spectral distribution information about the spectral image handed over from the initial value specification portion 43, by the reference reflectance $R(\lambda')$ registered with the reference table 32 of the dictionary 30. The brightness value calculation portion 44 hands over the calculated brightness value $e(\lambda')$ to the similarity determination portion 45.

Next, at step S24, the similarity determination portion 45 calculates a degree of similarity between the brightness value $e(\lambda')$ handed over from the brightness value calculation portion 44 and a brightness value of spectral distribution information within the reference wavelength range $\lambda'$ among the pieces of spectral distribution information for the parameters of the standard light source model registered with the light-source spectral distribution information table 33 of the dictionary 30. Then, the similarity determination portion 45 judges a parameter of the standard light source model with the highest similarity to the brightness value $e(\lambda')$ and hands over the parameters of the standard light source model to the spectral reflectance calculation section 46.

Next, at step S25, the spectral reflectance calculation section 46 acquires spectral distribution information about the standard light source model associated with the parameter of the standard light source model handed over from the similarity determination portion 45, from the light-source spectral distribution information table 33 of the dictionary 30. By dividing spectral distribution information about each pixel of the spectral image handed over from the spectral image acquisition section 41 by the spectral distribution information about the standard light source model acquired from the dictionary 30, the spectral reflectance calculation section 46 calculates a spectral reflectance of the pixel of the spectral image. The spectral reflectance calculation section 46 hands over the calculated spectral reflectance of each pixel of the spectral image to the pixel attribute identification portion 48.

Next, at step S26, the pixel attribute identification portion 48 calculates a degree of similarity between the spectral reflectance of each pixel of the spectral image handed over from the spectral reflectance calculation section 46 and the spectral reflectance of each surface state registered with the spectral reflectance table 31 of the dictionary 30. Then, for each pixel, the pixel attribute identification portion 48 assigns an attribute associated with a surface state with the highest degree of similarity to the spectral reflectance of the pixel of the spectral image, to the pixel. The pixel attribute identification portion 48 hands over the spectral image for which the attribute of each pixel has been identified, to the deterioration degree calculation portion 49.

Next, at step S27, the deterioration degree calculation portion 49 calculates a rate of the number of pixels to which an attribute indicating a deteriorated state is assigned, to an area (the number of pixels) of the whole spectral image, as a degree of deterioration. The deterioration degree calculation portion 49 hands over the calculated degree of deterioration to the result output section 50 as a diagnosis result.

Next, at step S28, the result output section 50 outputs the diagnosis result handed over from the deterioration degree calculation portion 49 by displaying the diagnosis result on the display device, and the diagnosis process ends.

As described above, according to the deterioration diagnosis device according to the present embodiment, a spectral reflectance of each surface state, a reference wavelength range, within which a reflectance is constant irrespective of a surface state, and a reference reflectance, and spectral distribution information about each parameter of a standard light source model are registered with a dictionary. Then, based on spectral distribution information about a spectral image obtained by measuring a diagnosis target object, and the spectral distribution information about each parameter of the standard light source model, the reference wavelength range and the reference reflectance that have been registered with the dictionary, spectral distribution information about a light source at the time of measuring the spectral image is estimated. Then, by calculating a spectral reflectance of each pixel of the spectral image using the estimated spectral distribution information about the light source, and comparing the spectral reflectance with the spectral reflectance of each surface state registered with the dictionary, a deterioration state of a position on the diagnosis target object corresponding to each pixel is diagnosed. Thereby, it is possible to, even under a different light source, such as outdoor light source, perform diagnosis of surface states of a diagnosis target object with a high accuracy without measuring spectral distribution information about a light source used at the time of measuring a spectral image by a spectrometer.

The above embodiment is a mere example of the present invention, and it is apparent that the present invention is not limited to the above embodiment. Therefore, addition, omission, replacement and other changes of components may be performed within a range not departing from the technical idea and scope of the present invention.

For example, the above embodiment has been described on a case where an attribute indicating whether a deteriorated state or a fine state is assigned to each pixel of a spectral image, but the description of the embodiment is non-restrictive. For example, identification information about a surface state (a sample name in the example of the present embodiment) may be assigned. Thereby, a more detailed diagnosis result can be acquired.

REFERENCE SIGNS LIST 10 deterioration diagnosis device
20 registration unit
21 spectral distribution information acquisition section
22 spectral reflectance calculation section
23 reference setting section
24 dictionary registration section
30 dictionary
31 spectral reflectance table
32 reference table
33 light-source spectral distribution information table
40 diagnosis unit
41 spectral image acquisition section
42 light source estimation section
43 initial value specification portion
44 brightness value calculation portion
45 similarity determination portion
46 spectral reflectance calculation section
47 surface state diagnosis section
48 pixel attribute identification portion
49 deterioration degree calculation portion
50 result output section

The invention claimed is:

1. A computer-implemented method for registering and diagnosing objects, the method comprising:
receiving, based on measured spectral data of a plurality of surface regions of a target object reflecting light from a light source, first spectral distribution information of a first surface region of the target object and second spectral distribution of a second surface region of the target object, wherein the first surface region and the second surface region are in a deteriorating state;
determining, based at least on the received first and second spectral distribution information and a predetermined spectral distribution information of a reference object, a a first spectral reflectance value of the first surface region of the target object and a second spectral reflectance value of the second surface region of the target object, wherein the predetermined spectral distribution information of the reference object is based on measured spectral data of a surface of the reference object reflecting light from the light source;
determining, based on the first and second spectral reflectance values, a range of wavelengths and a reference reflectance value of the range of wavelengths of the target object, wherein the first and second spectral reflectance values are within a predetermined deviation from each other at the range of wavelengths;
registering, as a set of dictionary entries for diagnosing the surface states of a diagnose object, one or more of:
the first and second spectral reflectance values,
the determined range of wavelengths,
the determined reference reflectance value of the target object, and
the predetermined spectral distribution information of the light source;
determining, based on the reference reflectance value, a surface state of the diagnose object; and
transmitting the surface state to an application configured to display the surface state as a diagnose result.

2. The computer-implemented method of claim 1, wherein the light source is a part of a set of predetermined light sources for reproducing an outdoor illumination environment.

3. The computer-implemented method of claim 1, the method further comprising:
receiving spectral image data of the diagnose object;
interactively receiving location information of a deterioration area in the spectral image data;
generating third spectral distribution information of the deterioration area based on pixel data of the deterioration area of the spectral image;
determining a degree of similarity between the third spectral distribution information and the predetermined spectral distribution information of the light source in the determined range of wavelengths as stored in the set of dictionary entries;
estimating, based on the determined degree of similarity, fourth spectral distribution information of the pixel data of the spectral image data of the diagnose object;
determining, based on the spectral distribution information of each pixel data of the spectral image data of the diagnose object and the estimated fourth spectral distribution information, a surface state of a location in the diagnose object corresponding to the pixel data; and
displaying the determined surface state as a result of a diagnosis of the diagnose object.

4. The computer-implemented method of claim 3, the method further comprising:
   determining a degree of deterioration of the diagnose object based on a ratio of a number of pixels indicating deterioration in the spectral image data over a number of pixels in the spectral image data;
   specifying a status of deterioration of the diagnose object based on the degree of deterioration and a predetermined threshold; and
   providing the surface status of the deterioration.

5. The computer-implemented method of claim 1, wherein the first spectral reflectance value of the first surface region of the target object indicates a rate of energy, expressed as a ratio of a luminous flux incident of a surface of the target object surface and a reflected luminous flux of each spectrum, that the target object reflects for each wavelength in spectral distribution of light from the light source, the spectral distribution of light from the light source includes a strength of the energy of each wavelength of light from the light source.

6. The computer-implemented method of claim 1, wherein the range of wavelengths represents a range of wavelengths where spectral reflectance values of a plurality of surface regions in the deteriorated state are within a predetermined deviation from the reference reflectance value.

7. The computer-implemented method of claim 1, wherein the first spectral distribution information of the first surface region of the target object is measured using a spectrometer, and wherein the first surface region indicates at least one of:
   polyethylene paint coated over a metal surface,
   rust fluid, or
   red rust due to aging.

8. A system for machine learning, the system comprises:
   a processor; and
   a memory storing computer-executable instructions that when executed by the processor cause the system to execute operations comprising:
      receiving, based on measured spectral data of a plurality of surface regions of a target object reflecting light from a light source, first spectral distribution information of a first surface region of the target object and second spectral distribution of a second surface region of the target object, wherein the first surface region and the second surface region are in a deteriorating state;
      determining, based at least on the received first and second spectral distribution information and a predetermined spectral distribution information of a reference object, a first spectral reflectance value of the first surface region of the target object and a second spectral reflectance value of the second surface region of the target object, wherein the predetermined spectral distribution information of the reference object is based on measured spectral data of a surface of the reference object reflecting light from the light source;
      determining, based on the first and second spectral reflectance values, a range of wavelengths and a reference reflectance value of the range of wavelengths of the target object, wherein the first and second spectral reflectance values are within a predetermined deviation from each other at the range of wavelengths; and
      registering, as a set of dictionary entries for diagnosing the surface states of a diagnose object, one or more of:
         the first and second spectral reflectance values,
         the determined range of wavelengths,
         the determined reference reflectance value of the target object, and
         the predetermined spectral distribution information of the light source;
      determining, based on the reference reflectance value, a surface state of the diagnose object; and
      transmitting the surface state to an application configured to display the surface state as a diagnose result.

9. The system of claim 8, wherein the light source is a part of a set of predetermined light sources for reproducing an outdoor illumination environment.

10. The system of claim 8, the computer-executable instructions when executed further causing the system to execute operations comprising:
    receiving spectral image data of the diagnose object;
    interactively receiving location information of a deterioration area in the spectral image data;
    generating third spectral distribution information of the deterioration area based on pixel data of the deterioration area of the spectral image;
    determining a degree of similarity between the third spectral distribution information and the predetermined spectral distribution information of the light source in the determined range of wavelengths as stored in the set of dictionary entries;
    estimating, based on the determined degree of similarity, fourth spectral distribution information of the pixel data of the spectral image data of the diagnose object;
    determining, based on the spectral distribution information of each pixel data of the spectral image data of the diagnose object and the estimated fourth spectral distribution information, a surface state of a location in the diagnose object corresponding to the pixel data; and
    displaying the determined surface state as a result of a diagnosis of the diagnose object.

11. The system of claim 10, the computer-executable instructions when executed further causing the system to:
    determining a degree of deterioration of the diagnose object based on a ratio of a number of pixels indicating deterioration in the spectral image data over a number of pixels in the spectral image data;
    specifying a status of deterioration of the diagnose object based on the degree of deterioration and a predetermined threshold; and
    providing the surface status of the deterioration.

12. The system of claim 8, wherein the first spectral reflectance value of the plurality of surface region of the target object indicates a rate of energy, expressed as a ratio of a luminous flux incident of a surface of the target object surface and a reflected luminous flux of each spectrum, that the target object reflects for each wavelength in spectral distribution of light from the light source, the spectral distribution of light from the light source includes a strength of the energy of each wavelength of light from the light source.

13. The system of claim 8, wherein the range of wavelengths represent a range of wavelengths where spectral reflectance values of a plurality of surface regions in the deteriorated state are within a predetermined deviation from the reference reflectance value.

14. The system of claim 8, wherein the spectral distribution information of the first surface region of the target object is measured using a spectrometer, and wherein the first surface region indicates at least one of:
polyethylene paint coated over a metal surface,
rust fluid, or
red rust due to aging.

15. A computer-readable non-transitory recording medium storing computer-executable instructions that when executed by a processor cause a computer system to execute operations comprising:
receiving, based on measured spectral data of a plurality of surface regions of a target object reflecting light from a light source, first spectral distribution information of a first surface region of the target object, wherein the first surface region and the second surface region are in a deteriorating state;
determining, based at least on the received first and second spectral distribution information and a predetermined spectral distribution information of a reference object, a first spectral reflectance value of the first surface region of the target object and a second spectral reflectance value of the second surface region of the target object, wherein the predetermined spectral distribution information of the reference object is based on measured spectral data of a surface of the reference object reflecting light from the light source;
determining, based on the first and second spectral reflectance values, a range of wavelengths and a reference reflectance value of the range of wavelengths of the target object, wherein the first and second spectral reflectance values are within a predetermined deviation from each other at the range of wavelengths;
registering, as a set of dictionary entries for diagnosing the surface states of a diagnose object, one or more of:
the first and second spectral reflectance values,
the determined range of wavelengths,
the determined reference reflectance value of the target object, and
the predetermined spectral distribution information of the light source;
determining, based on the reference reflectance value, a surface state of the diagnose object; and
transmitting the surface state to an application configured to display the surface state as a diagnose result.

16. The computer-readable non-transitory recording medium of claim 15, wherein the light source is a part of a set of predetermined light sources for reproducing an outdoor illumination environment.

17. The computer-readable non-transitory recording medium of claim 15, the computer-executable instructions when executed further causing the system to execute operations comprising:
receiving spectral image data of the diagnose object;
interactively receiving location information of a deterioration area in the spectral image data;
generating third spectral distribution information of the deterioration area based on pixel data of the deterioration area of the spectral image;
determining a degree of similarity between the third spectral distribution information and the predetermined spectral distribution information of the light source in the determined range of wavelengths as stored in the set of dictionary entries;
estimating, based on the determined degree of similarity, fourth spectral distribution information of the pixel data of the spectral image data of the diagnose object;
determining, based on the spectral distribution information of each pixel data of the spectral image data of the diagnose object and the estimated fourth spectral distribution information, a surface state of a location in the diagnose object corresponding to the pixel data; and
displaying the determined surface state as a result of a diagnosis of the diagnose object.

18. The computer-readable non-transitory recording medium of claim 15, wherein the first spectral reflectance value of the first surface region of the target object indicates a rate of energy, expressed as a ratio of a luminous flux incident of a surface of the target object surface and a reflected luminous flux of each spectrum, that the target object reflects for each wavelength in spectral distribution of light from the light source, the spectral distribution of light from the light source includes a strength of the energy of each wavelength of light from the light source.

19. The computer-readable non-transitory recording medium of claim 15, wherein the range of wavelengths represent a range of wavelengths where spectral reflectance values of a plurality of surface regions in the deteriorated state are within a predetermined deviation from the reference reflectance value.

20. The computer-readable non-transitory recording medium of claim 15, wherein the first spectral distribution information of the first surface region of the target object is measured using a spectrometer, and wherein the first surface region indicates at least one of:
polyethylene paint coated over a metal surface,
rust fluid, or
red rust due to aging.

* * * * *